July 8, 1941.  A. E. RATHBUN  2,248,413
SEAT CONSTRUCTION
Filed July 22, 1938
FIG. I.
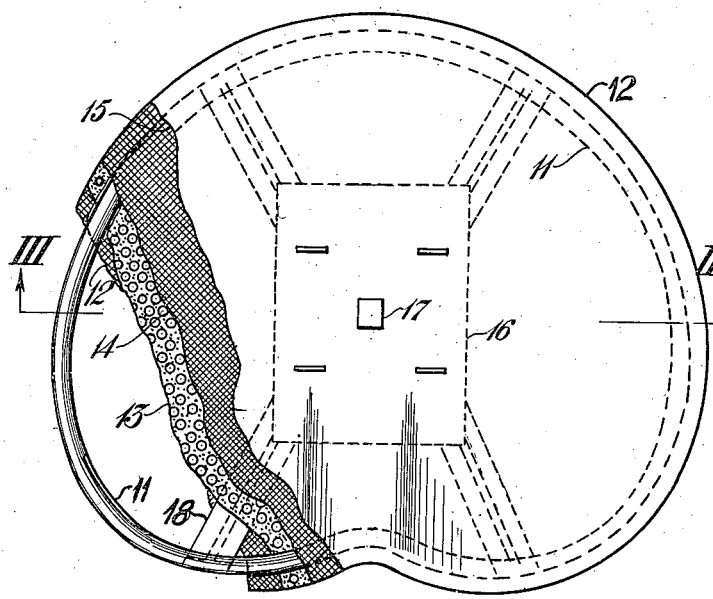
FIG. II.
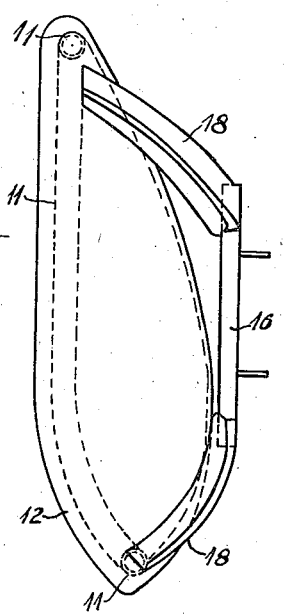
FIG. III.
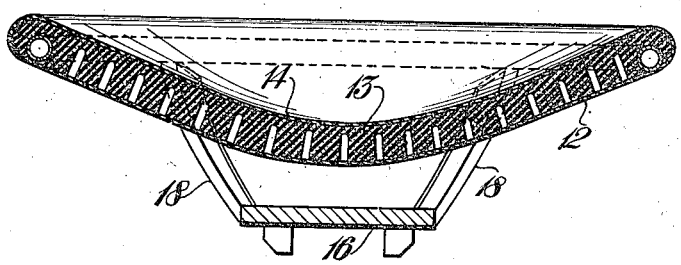
FIG. IV.
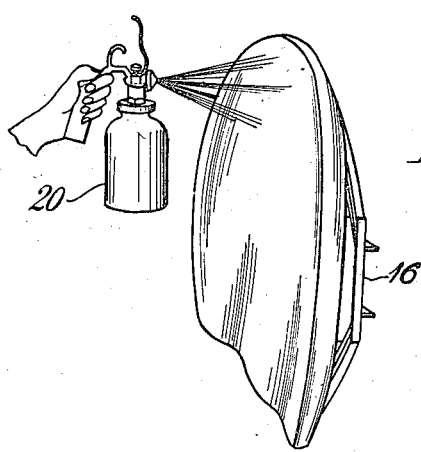
INVENTOR
Alan E. Rathbun
BY
Ely & Frye
ATTORNEY Patented July 8, 1941

2,248,413

UNITED STATES PATENT OFFICE 2,248,413

SEAT CONSTRUCTION

Alan E. Rathbun, Akron, Ohio, assignor to The Firestone Tire & Rubber Company, Akron, Ohio, a corporation of Ohio Application July 22, 1938, Serial No. 220,765

4 Claims. (Cl. 155—179)

This invention relates generally to seats, more especially to seats for tractors and other similar poorly-sprung, or hard-riding vehicles.

Heretofore tractor seats and the like have usually comprised a metal seat which has a resilient pad thereon. This pad absorbs only a portion of the vibrations and shock incident to movement of the tractor so that a person upon the seat is subjected to continuous shocks and vibrations when the tractor is moving.

The main object of this invention is to provide a seat cushion which is adapted to absorb the vibration produced by the tractor or the like and to carry a person sitting thereon comfortably even though the seat is mounted upon a hard-riding vehicle. It also is an object of the invention to provide a seat which adapts itself to the immediate load placed thereon.

The foregoing and other objects are achieved by constructing a seat from a substantially annular frame which has a fabric supporting sheet secured thereto. A resilient rubber pad is carried by the fabric sheet and secured thereto in any suitable manner whereby a load upon the seat distorts the seat so that it conforms to the load and then the rubber cushion and fabric cooperate to absorb substantially all of the vibration produced by the tractor.

In the accompanying drawing:

Figure 1 is an elevation, with a portion of the covering material removed, of a seat embodying the invention;

Figure 2 is a right side elevation of the seat of Figure 1;

Figure 3 is a transverse cross sectional view on line 3—3 of Figure 1 when the seat is under load; and Figure 4 is a perspective view showing how the seat is water-proofed.

Referring specifically to the drawing, a substantially annular tubular frame 11 having an open center area is provided which has a fabric supporting sheet 12 associated therewith to provide a fabric center portion for the frame. A resilient cushioning pad 13, such as one made from a sponge, or cellular foam rubber is carried by the fabric sheet 12 and its base may be provided with small cylindrical holes therein, as shown. A second fabric sheet 14, or a continuation of the sheet 12 is placed over the top of the rubber pad 13 in order to hold it in position. The ends of the fabric sheet 14 are wrapped around the frame 11 and secured to the bottom surface of the fabric sheet 12 by suitable adhesive means.

Preferably the outer fabric sheets of the seat are water-proofed and a suitable latex composition is sprayed thereon by a spray gun 20 for this purpose to form a latex rubber film 15 around the seat. Figure 4 indicates how the fabric sheets may be water-proofed after the seat is assembled.

A metal plate 16 having a hole 17 therein is provided to mount the seat 10. The metal plate 16 is connected to the frame 11 by integral arms 18 that extend upwardly and outwardly from the ends of the plate. Thus the seat is easily secured to a vehicle by a bolt through the hole 17 and it may readily be moved from one vehicle to another, as desired. Figure 3 indicates how the fabric seats and rubber pad may be depressed under load without bottoming against the seat support.

It will be observed that if load is applied to only one side of the seat of the invention only that side will be deflected and the seat will not take the catenary curve shown. By supporting a person upon the seat, the repeated shocks and vibrations occasioned by movement of a poorly sprung vehicle are absorbed by the seating means and are not directly transmitted to the person thereon. The foregoing result is obtained by eliminating the rigid connection usually made between the supporting portion of the seat and the vehicle to which the seat is secured. This is a feature of the invention and differs appreciably from the structures of prior art, such as structures comprising a metal seat carrying a resilient pad.

In accordance with the patent statutes, I have illustrated and described the structure and operation of an embodiment of the invention. However, it will be understood that various modifications can be made without departing from the scope of the invention as defined in the appended claims.

What is claimed is:

1. A seat for a tractor or other poorly-sprung vehicle comprising a substantially annular frame having an open center area, a fabric sheet carried by said frame and providing a supporting sheet extending therebetween, a sponge rubber cushion carried by said sheet, water-proofed covering means associated with said sheet, and a metal plate secured at its ends to opposed portions on said frame to mount said seat whereby said pad and said sheet provide a resilient deflectable support for the driver of the tractor and position him free from the vibrations of the tractor.

2. A seat for a tractor or other poorly-sprung vehicle comprising a substantially annular frame having an open center area, a fabric sheet carried by said frame and filling its center area, a sponge rubber cushion carried by said sheet, said sponge cushion covering the upper surface of and substantially embedding said frame, covering means associated with said sheet, and a metal plate secured to said frame to mount said seat whereby a yieldable seat is provided which seat adapts itself to the load placed thereon.

3. In a seat construction, a substantially annular frame, a sponge rubber cushion associated with said frame and filling the center area thereof, and a fabric sheet looped entirely around said frame and said rubber cushion to form a supporting unit therewith.

4. A seat comprising an open centered annular frame having a depressed leg receiving portion therein, flexible supporting means secured to said frame and extending across the center thereof, a sponge rubber cushion carried by said supporting means and substantially embedding said frame therein, and mounting means secured to said frame and being positioned appreciably below said frame at the center thereof whereby the seat is adapted to support a person comfortably even though its center portion is depressed by the supported person.

ALAN E. RATHBUN.